Patented Nov. 18, 1952

2,618,636

UNITED STATES PATENT OFFICE 2,618,636

BIS (2 - MORPHOLINO - 4 - AMINO-1,3,5-TRI-AZYL-(6)-)-4,4' - DIAMINOSTILBENE SULFONIC AND CARBOXYLIC ACIDS

William W. Williams, Easton, Pa., and William E. Wallace, Phillipsburg, N. J., assignors to General Aniline & Film Corporation, New York, N. Y., a corporation of Delaware No Drawing. Application August 24, 1948, Serial No. 45,978

7 Claims. (Cl. 260—247.1)

1

This invention relates to novel bis[2-morpholino - 4 - amino-1,3,5-triazyl-(6)-]-4,4'-diaminostilbene sulfonic and carboxylic acids possessing new and useful properties which render them particularly useful as fluorescing optical bleaching or whitening agents.

A number of derivatives of 4,4'-diaminostilbene-2,2'-disulfonic and carboxylic acids possess the property of fluorescing (i. e. they absorb ultraviolet light and emit light within visible range—frequently a blue light), and have found extensive use as optical bleaching agents for cellulosic materials, etc. as they tend to neutralize any yellowness of the material and thus increase the apparent whiteness of the material.

We have now discovered certain novel derivatives of 1,3,5-triazyl derivatives of 4,4'-diaminostilbene sulfonic and carboxylic acids in which the 2-position of the triazyl ring contains a morpholine substituent. These novel compounds are extremely valuable fluorescing agents which fluoresce with a desirable shade and possess remarkable stability to chlorine, i. e. they have a substantially better chlorine fastness than known bis[1,3,5 - triazyl-(6) -]-4,4'-diaminostilbene-2,2'-disulfonic acids such as those described in U. S. Patent No. 2,171,427 issued August 29, 1939 to John Eggert and Bruno Wendt, for use in wrapping materials such as paper, regenerated cellulose and the like. In addition, as a class, these novel morpholine derivatives of 1,3,5 - triazyl - 4,4'-diaminostilbene sulfonic and carboxylic acids have at least equal stability to light and in some cases improved light fastness over known related compounds. In view of the improved chlorine fastness and good light fastness and desirable shade of fluorescence possessed by these novel morpholine derivatives of 1,3,5-triazyl-4,4'-diaminostilbene sulfonic and carboxylic acids, they are of especial value in many applications for fluorescing agents, such as for use as optical bleaching or whitening agents.

In order to simplify the description, the present invention will be described with particular reference to the derivatives of 4,4'-diaminostilbene-2,2'-disulfonic acid since the 2,2'-disulfonic acid is usually employed; it has been found that the derivatives of other 4,4'-diaminostilbene sulfonic and carboxylic acids possess substantially similar properties, and thus the corresponding derivatives of 4,4'-diaminostilbene-3,3'-disulfonic acid, 4,4'-diaminostilbene-2,2',6,6'-tetrasulfonic acid, 4,4'-diaminostilbene-2,2'-dicarboxylic acid, or 4,4'-diaminostilbene-3,3'-dicarboxylic acid may be considered as equivalents of the derivatives of 4,4'-diaminostilbene-2,2'-disulfonic acid which are specifically mentioned.

The novel bis[2-morpholino-4-amino-1,3,5-triazyl-(6)-]-4,4'-diaminostilbene sulfonic and carboxylic acids which we have found to be particularly valuable fluorescing agents may be represented by the following general formula:

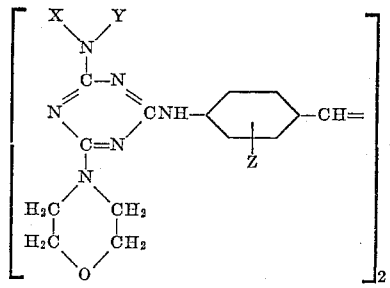

In the above formula Z represents a —SO₃H or —COOH group and X and Y may be alike or may be varied widely. For instance, if X is H, Y may be H, alkyl or substituted alkyl such as CH₃—, C₂H₅—, (CH₃)₂CH—, n—C₄H₉, sec. C₄H₉, C₁₂H₂₅, CH₂CH₂OH, —CH₂OH, etc., aryl such as C₆H₅—, ClC₆H₄—, CH₃C₆H₄—, CH₃OC₆H₄—, (naphthyl) C₁₀H₇—, C₁₄H₉, (anthracene) HO₃SC₆H₄—, (CH₃)₂C₆H₃—, etc., heterocyclic such as

thiazole, benzothiazole, tetrazole, etc., alicyclic such as cyclohexyl, tetrahydronaphthyl, etc. If X is alkyl or substituted alkyl such as methyl, ethyl, propyl, hydroxyethyl, methylol, etc., Y may be alkyl or substituted alkyl such as CH₃—, C₂H₅, C₃H₇, C₄H₉, —CH₂OH, CH₂CH₂OH, etc., aryl residues such as C₆H₅—, ClC₆H₄—, CH₃OC₆H₄—, CH₃C₆H₄—, C₁₀H₇, etc. and heterocyclic such as thiazole, pyrimidine, benzothiazole, etc. and finally X and Y together may go to form cyclic residues such as pyrimidine, morpholine, thiomorpholine.

These novel compounds are readily prepared, for example, by condensing one molecular proportion of 4,4'-diaminostilbene-2,2'-disulfonic acid with two molecular proportions of cyanuric chloride. The primary condensation product thus obtained is then condensed with two molecular proportions of ammonia or a primary or secondary amine capable of yielding the group:

desired in the final product and finally, the thus obtained product is condensed with two molecular proportions of morpholine. Detailed procedures of preferred synthesis of these novel compounds are described in connection with the specific examples. By selection of the particular reactants, the entire class of novel fluorescing agents embodied in the present invention may be produced by these procedures.

These products are useful when incorporated into paper or other wrapping material to improve the whiteness as well as to protect the contents from the action of ultraviolet light. They are useful in improving the whiteness of paints; when applied to fabrics by methods well known in the art, the whitness is remarkably improved. The white background of photographic prints and diazotype prints can be improved by incorporating some of the material into the coating formulations. By addition of some of these materials to discharge pastes, the whites which are obtained upon discharge are remarkably whiter than discharges which are made in the absence of this material. If small amounts of these materials are used in soaps or other detergents, fabrics which are washed using these formulations will be much whiter in the case of whites and brighter in the case of colors than fabrics which are washed with ordinary soaps or detergents. These materials may be used in bleaching processes for various fibers. In such cases, the amount of bleach necessary is materially reduced.

The preparation of specific compounds of the above mentioned types are illustrated by the following examples:

*Example 1*

Thirty-seven parts of cyanuric chloride are dissolved in 120 parts of acetone and poured into a mixture of ice and water. During the suspension in ice water, the temperature of the aqueous suspension should not rise above 5° C. Thirty-seven parts of 4,4'-diaminostilbene-2,2'-disulfonic acid are dissolved in 150 parts of water with the addition of enough sodium carbonate to give a neutral solution. This solution is added slowly to the cyanuric chloride suspension and at the same time a solution of sodium carbonate is added in order to keep the mixture from becoming too acid. The temperature should not rise above 5° C. during this condensation. The condensation is complete when a sample of the reaction mixture which has been acidified and treated with sodium nitrite does not develop color when treated with an alkaline solution of R salt.

When the condensation is complete, a solution of 25.9 parts of aniline hydrochloride is added and immediately afterward a solution of 160 parts of anhydrous sodium acetate in 400 parts of water is added. The mixture is allowed to warm to room temperature and may be heated to 35-40° C. if necessary to complete the condensation. When this secondary condensation is complete, 25 parts of morpholine is added and the pH is increased to 7.5-8 with sodium carbonate solution. Then the mixture is heated slowly to 90° C. and maintained at that temperature for 3 hours. The mixture is then cooled and the product is isolated in the usual manner. It corresponds to the formula:

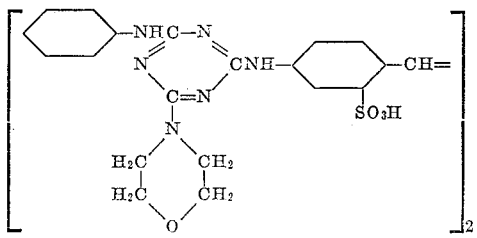

The material which is obtained is tan in color and moderately soluble in water but very slightly soluble in acetone, alcohol, ether, etc.

When this material is incorporated into discharge pastes and applied to fabrics, the whites thus obtained were remarkably whiter than those obtained using ordinary discharge pastes. When this material is applied to fibers of cellulose, wool or nylon, by methods well known in the art, the white appearance of the fabric is thereby much improved.

If small amounts of this substance are added to soap or detergent and the resulting mixture is used to wash fabrics of cellulose, wool or nylon, the white materials thus washed are extraordinarily whiter in appearance and colored materials are brighter than similar materials which are washed using ordinary soaps or detergents.

*Example 2*

If in Example 1, 34.6 parts sulfanilic acid are used in place of aniline hydrochloride, a product of the following composition is obtained:

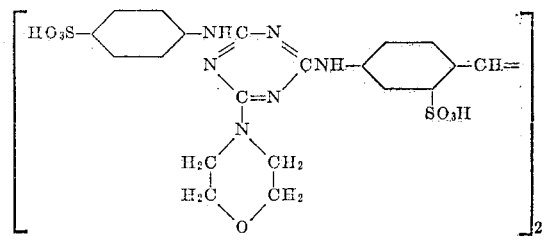

The properties of this substance are similar to those of the compound in Example 1.

*Example 3*

If in Example 1, 31.9 parts of p-anisidine hydrochloride are used in place of aniline hydrochloride, a compound is obtained which can be represented by the following formula:

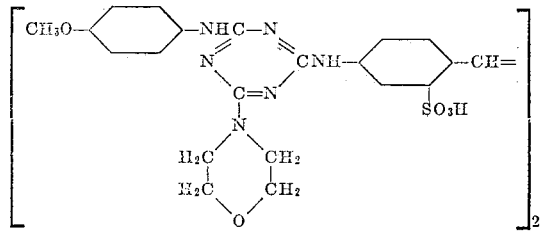

If this compound is used in the tests mentioned in Example 1, the results are similar.

*Example 4*

If in Example 1, 31.9 parts of o-anisidine hydrochloride are used in place of aniline hydrochloride, a compound is obtained which can be represented by the following formula:

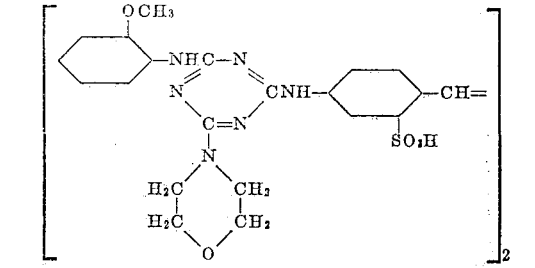

If this compound is used in the tests mentioned in Example 1, the results are similar.

*Example 5*

If in Example 1, aniline hydrochloride is replaced by 28.7 parts of meta-toluidine hydrochloride, a compound corresponding to the following structure is obtained:

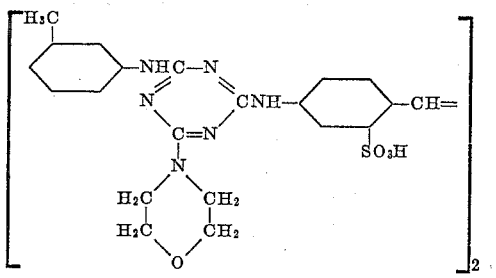

If this compound is used in the tests described in Example 1, results of a similar nature are obtained.

Example 6

If in Example 1, aniline hydrochloride is replaced by 28.7 parts of p-toluidine hydrochloride, a compound corresponding to the following structure is obtained:

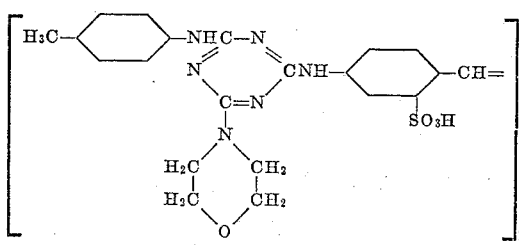

If this compound is used in the tests described in Example 1, results of a similar nature are obtained.

Example 7

If in Example 1 aniline hydrochloride is replaced by 17.4 parts of morpholine, a product of the following structure is obtained:

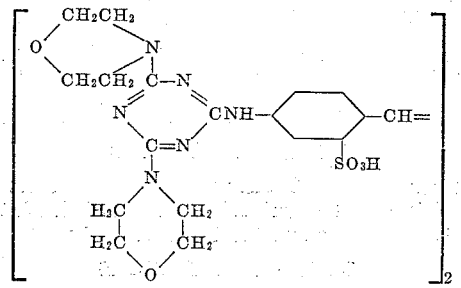

The properties of this substance are similar to those of the product mentioned in Example 1.

Example 8

If in Example 1, aniline hydrochloride is replaced by 32.8 parts of o-chloroaniline hydrochloride, a product wihch can be represented by the following structure is obtained:

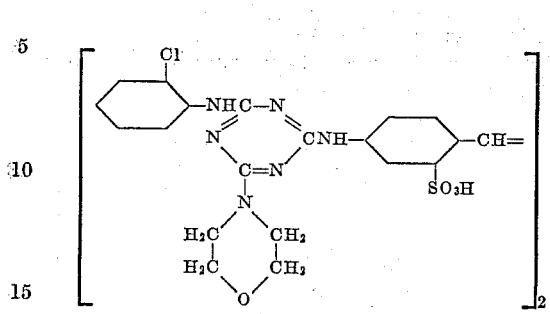

The properties of this substance are similar to those of the product described in Example 1.

It will be apparent that the novel fluorescent agents of the present invention will be obtained in the form of their alkali salts from alkaline solutions and will be obtained in the form of acids from acid solutions, the acids being convertible to salts by neutralization and the salts being convertible to the acids by acidification.

In the place of the specific amino compounds condensed with the condensation product of cyanuric chloride and 4,4'-diaminostilbene-2,2'-disulfonic acid in the foregoing examples, other primary and secondary amino compounds capable of yielding the group:

may be employed, if desired, under similar conditions and in equivalent proportions. As examples of such primary and secondary amines may be mentioned lower alkyl primary and secondary amines such as methylamine, dimethylamine, ethylamine, isopropylamine, normal and secondary butylamine and higher homologues such as laurylamine, stearylamine, etc.; also such compounds as β-hydroxy ethylamine and aryl amines such as naphthylamine, anthracene amine or heterocyclic amino compounds such as pyrimidine, benzothiazole and the like.

In comparative tests against similar products which contain, for instance, aniline, diethanolamine, hydroxyl, p-anisidine, piperidine, etc., in place of the morpholine groups those containing a morpholine group were found as a class to fluoresce at least as well and to possess at least equal light stability and in addition were found to possess substantially greater stability to chlorine.

What we claim is:

1. A compound of the general formula

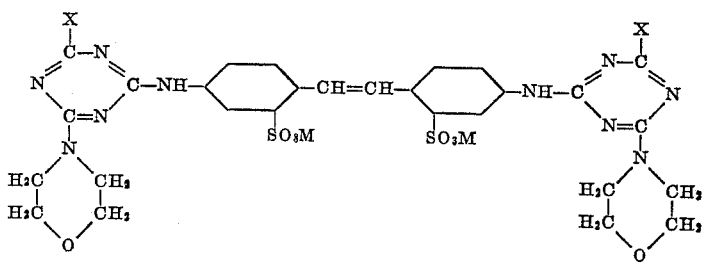

wherein M represents a member of the group consisting of hydrogen and alkali metal and X represents a member of the group consisting of anisidino and sulfoanilino radicals.

2. Bis[2-morpholino-4-amino benzene-p-sulfonic acid - 1,3,5 - triazyl(6)]4,4'-diamino-2,2'-stilbene-disulfonic acid, of the formula

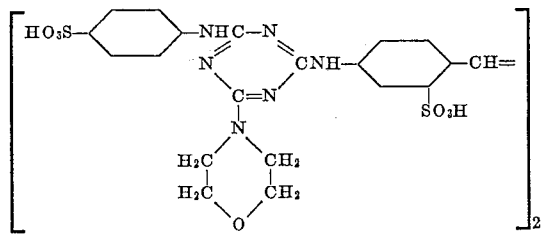

3. Bis[2 - morpholino - 4 - o - anisidino-1,3,5-triazyl(6)]4,4'-diamino-2,2'-stilbene disulfonic acid, of the formula

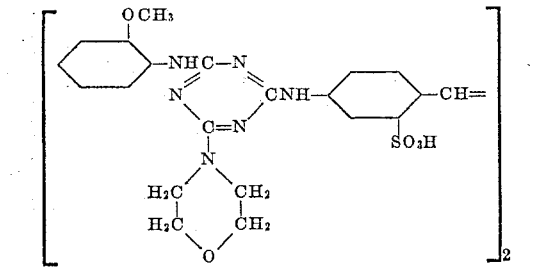

4. Bis[2 - morpholino - 4 - p - anisidino-1,3,5-triazyl (6)]4,4'-diamino-2,2'-stilbene disulfonic acid of the formula

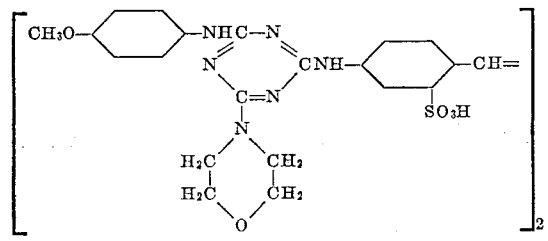

5. The alkali metal salts of bis[2-morpholino-4 - o - anisidino - 1,3,5 - triazyl (6)]4,4'-diamino-2,2'-stilbene disulfonic acid of the formula

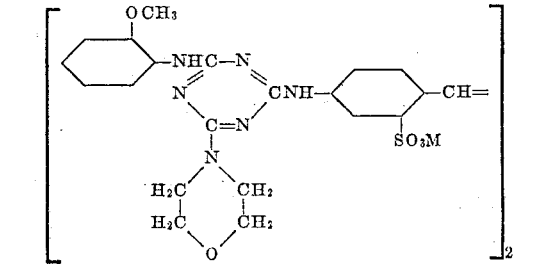

wherein M represents the alkali metal.

6. The alkali metal salts of bis[2-morpholino-4 - p - anisidino - 1,3,5 - triazyl (6)]4,4'-diamino-2,2'-stilbene disulfonic acid of the formula

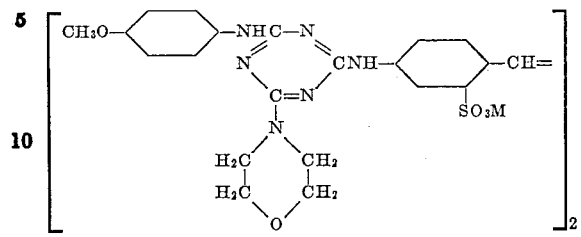

wherein M represents alkali metal.

7. The alkali metal salts of bis[2-morpholino-4-amino benzene-p-sulfonic acid-1,3,5-triazyl (6)]4,4'-diamino-2,2'-stilbene disulfonic acid of the formula

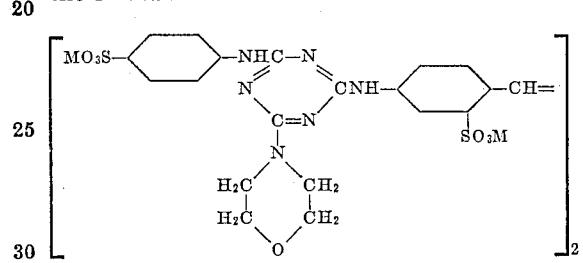

wherein M represents alkali metal.

WILLIAM W. WILLIAMS.
WILLIAM E. WALLACE.

REFERENCES CITED

The following references are of record in the file of this patent:

UNITED STATES PATENTS

| Number | Name | Date |
| --- | --- | --- |
| 2,171,427 | Eggert et al. | Aug. 29, 1939 |
| 2,235,480 | Graenacher et al. | Mar. 18, 1941 |
| 2,306,439 | Hentrech et al. | Dec. 29, 1942 |
| 2,320,882 | Oldham | June 1, 1943 |
| 2,376,743 | Wendt | May 22, 1945 |
| 2,399,066 | Schmid et al. | Apr. 23, 1946 |
| 2,427,314 | Thurston | Sept. 9, 1947 |

FOREIGN PATENTS

| Number | Country | Date |
| --- | --- | --- |
| 55,370 | Netherlands | Oct. 15, 1943 |
| 233,745 | Switzerland | Dec. 1, 1944 |

OTHER REFERENCES

Fieser et al.: Organic Chemistry, Heath and Co. (1944), p. 720.

Ser. No. 381,856, Wendt (A. P. C.), published May 11, 1943.